Aug. 9, 1932.   W. DUBILIER   1,870,949
ROLLED CONDENSER
Filed June 24, 1926
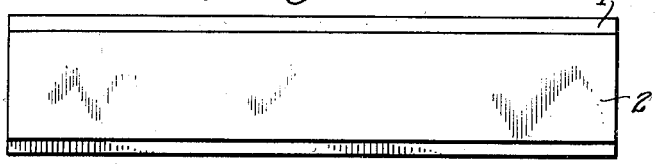
*Fig. 1.*
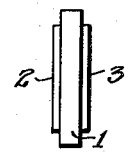
*Fig. 2.*
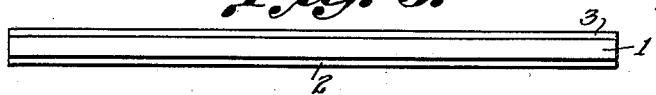
*Fig. 3.*
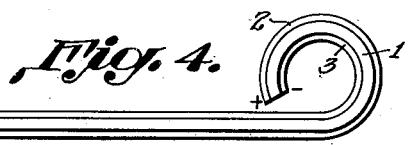
*Fig. 4.*
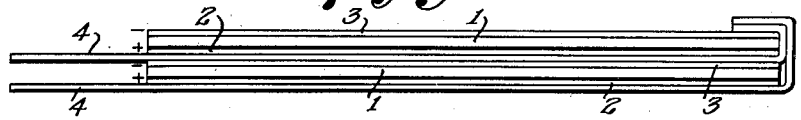
*Fig. 5.*
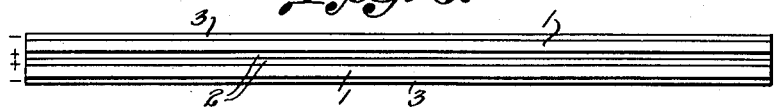
*Fig. 6.*
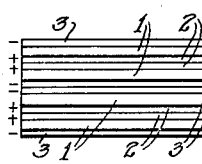
*Fig. 7.*
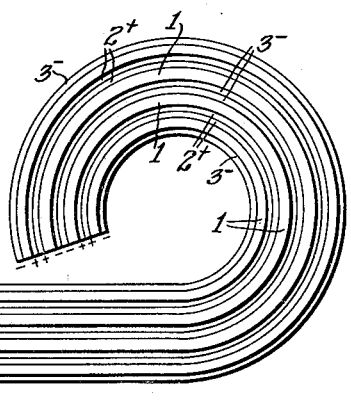
Inventor:
William Dubilier
BY Edwards, Borrer & Pool.
ATTORNEYS.

Patented Aug. 9, 1932

1,870,949

UNITED STATES PATENT OFFICE

WILLIAM DUBILIER, OF NEW ROCHELLE, NEW YORK, ASSIGNOR TO DUBILIER CONDENSER CORPORATION, OF NEW YORK, N. Y., A CORPORATION OF DELAWARE

ROLLED CONDENSER

Application filed June 24, 1926. Serial No. 118,383.

The invention relates to improvements in electrical condensers; especially condensers having parts in the form of flexible strips or sheets which can be rolled or bent to give the condenser the desired size and shape.

An object of the invention is to provide a condenser made of flexible strips or sheets of insulation, each of which has a film or layer of conductive material on both faces, and so designed that it requires no insulating material, between such sheets or units. As a result the condenser can be easily and cheaply made, is of relatively small size, and has comparatively low insulation losses.

The foregoing and other objects and advantages of the invention will be made clear in the following description, taken with the drawings; but the disclosure is illustrative only, and I may make changes in details without departing from the principle of the invention or exceeding the scope of the appended claims.

On said drawing,

Figure 1 is a plan view,

Figure 2 an end view; and

Figure 3 a top view of a unit of a condenser according to my invention;

Figure 4 shows such a unit about to be rolled up;

Figure 5 shows how two or more such units would ordinarily require insulation between them if the units are rolled up;

Figure 6 shows how two or more units can be combined for rolling together, and at the same time dispense with intervening insulation; and Figure 7 shows a plurality of such units so arranged and ready to be rolled up to make the body of the condenser.

The same characters identify the same parts throughout.

Referring first to Figures 1, 2 and 3, I show a condenser unit comprising a sheet or strip of insulating material 1, having conductive material 2 on one side and electrically conductive material 3 on the opposite side or face. This unit or element may be so made that the strip of insulation 1 comprises a film of a substance similar to that employed for motion pictures or any other suitable material, and the electrically conductive layers 2 and 3 may be films of thin metal attached to the opposite faces of the strip 1 in any suitable way. The insulation 1 is flexible, so that if a condenser were to be made out of a single such unit, the insulation with the conductive layers 2 and 3 could easily be rolled up as in Figure 4.

If, however, one such unit only be employed, one of the layers such as the layer 2 will have to be a positive potential for example, and then the layer 3 will have to be negative. When such a unit is rolled up, the layer 2 would make actual contact with the layer 3, and then the two conductive parts of the condenser would no longer be insulated from each other. To obviate this difficulty, I could proceed as shown in Figure 5, which presents two such units with strips of insulation 4 which may be paper or any other desirable material. With such a strip of paper, or the like, a condenser can be made by taking one such unit or two, arranging one strip of paper between the two units as in Figure 5, and the other strip to cover the other unit; whereupon the two units can then be rolled up and their parts of opposite polarity be kept out of contact by the paper even though the layer 2 of one unit be arranged close to the layer 3 of opposite polarity to the other unit.

This method of making a condenser out of one or more units of insulating material 1 with electrically conductive layers or armatures of opposite polarity on the two faces, thus necessitates the employment of additional insulation in the shape of strips of paper or the like 4, and thus requires additional insulation and adds to the expense of manufacture. I have found that I can dispense with such additional insulation merely by proceeding in accordance with the diagram shown in Figures 6 and 7.

In Figure 6, I arrange two or more units 1 by putting them together in such a way that a conductive layer or armature on one face of one unit, makes direct contact with a similar conductive layer or armature on the adjacent face of the contiguous unit. For example, if the two units shown in Figure 6 be disposed so that their layers 2 make contact, then the layers 3 of the two units will be remote from each other, and will constitute the two outer layers of the construction. Then the two inner layers 2 can be of one polarity, and the two outer layers of a different polarity with respect to the layers 2, but of the same polarity with respect to each other. Upon rolling up the two units to make a single rolled condenser, the bottom outside layer 3 will make contact with nothing else but the upper outside layer 3 which is of the same polarity, and the layers 3 will always be insulated from the layers 2, and no intervening dielectric between any two neighboring units is needed.

Figure 7 shows such a condenser consisting of more than two units superposed and about to be rolled up. The outer layer 3 of the bottom unit will, when the condenser is rolled up and given its final shape, make contact with the outer layer 3 of the top unit. But there will be parts of opposite polarity in alternation through the body of the condenser and one needs only to connect an electric terminal to a layer 3 of one of the units on the outside of the roll, and another electric terminal to the two layers 2 which are nearest to the center of the roll, to enable the condenser to be connected in circuit. Thus I make a complete condenser without requiring any insulation such as the strips 4 between the units and all the advantages which are obtained by the employment of a unit comprising insulation 1 with a film of conductive material on each face, are retained.

Having described my invention, what I believe to be new and desire to secure and protect by Letters Patent of the United States is:—

1. A condenser comprising rolled units having armatures, said units being connected in series by certain of the armatures contacting with each other.

2. A wound condenser comprising a plurality of units, each unit having conductive layers, the layers of adjacent units being superposed, and in contact with each other, to connect said units in series.

3. A condenser comprising rolled up units, said units each having conductive layers on its opposite faces, the layers of adjacent units being in contact over substantially their entire area, so that said units are connected in series.

In testimony whereof I affix my signature.
WILLIAM DUBILIER.